(12) United States Patent
Eilmsteiner et al.

(10) Patent No.: US 12,072,235 B2
(45) Date of Patent: Aug. 27, 2024

(54) FILTER ASSEMBLY, DETECTOR, AND METHOD OF MANUFACTURE OF A FILTER ASSEMBLY

(71) Applicant: ams AG, Premstätten (AT)

(72) Inventors: Gerhard Eilmsteiner, Eindhoven (NL); Desislava Oppel, Eindhoven (NL); Deborah Morecroft, Eindhoven (NL); Jens Hofrichter, Eindhoven (NL)

(73) Assignee: AMS AG, Premstätten (AT)

( * ) Notice: Subject to any disclaimer, the term of this patent is extended or adjusted under 35 U.S.C. 154(b) by 707 days.

(21) Appl. No.: 17/263,244

(22) PCT Filed: Jul. 26, 2019

(86) PCT No.: PCT/EP2019/070211
§ 371 (c)(1),
(2) Date: Jan. 26, 2021

(87) PCT Pub. No.: WO2020/025483
PCT Pub. Date: Feb. 6, 2020

(65) Prior Publication Data
US 2021/0164831 A1    Jun. 3, 2021

(30) Foreign Application Priority Data
Jul. 30, 2018    (EP) .................................. 18186348

(51) Int. Cl.
*G01J 1/04*    (2006.01)
*G01J 3/02*    (2006.01)
(Continued)

(52) U.S. Cl.
CPC ........... *G01J 1/0492* (2013.01); *G01J 1/0474* (2013.01); *G01J 1/0488* (2013.01); *G01J 3/0205* (2013.01);
(Continued)

(58) Field of Classification Search
CPC ...... G01J 1/0492; G01J 1/0474; G01J 1/0488; G01J 3/0205; G01J 3/51; G01J 2003/1226;
(Continued)

(56) References Cited

U.S. PATENT DOCUMENTS 7,388,208 B2    6/2008  Deych
7,968,853 B2    6/2011  Altman et al.
(Continued)

FOREIGN PATENT DOCUMENTS

CN    102262253 A    11/2011
JP    2002528728 A    9/2002
(Continued)

OTHER PUBLICATIONS

Kayaku Advance Materials "Technical Data Sheet for SU-8" (Year: 2020).*
(Continued)

*Primary Examiner* — George G. King
(74) *Attorney, Agent, or Firm* — MH2 TECHNOLOGY LAW GROUP LLP

(57) ABSTRACT

A filter assembly includes an incident medium, a spacer, at least one dielectric filter and an exit medium. The spacer is arranged between the incident medium and the at least one dielectric filter such that the incident medium and the at least one dielectric filter are spaced apart by a working distance and thereby enclose a medium of lower index of refraction than the incident medium. The at least one dielectric filter is arranged on the exit medium.

18 Claims, 9 Drawing Sheets

(51) Int. Cl.
*G01J 3/12* (2006.01)
*G01J 3/51* (2006.01)
*G01T 1/20* (2006.01)
*G02B 5/28* (2006.01)

(52) U.S. Cl.
CPC .............. *G01J 3/51* (2013.01); *G01T 1/2002* (2013.01); *G01T 1/2008* (2013.01); *G02B 5/28* (2013.01); *G01J 2003/1226* (2013.01); *G01J 2003/123* (2013.01); *G01J 2003/1239* (2013.01); *G02B 5/284* (2013.01); *G02B 5/288* (2013.01)

(58) Field of Classification Search
CPC ........ G01J 2003/123; G01J 2003/1239; G01T 1/2002; G01T 1/2008; G02B 5/28; G02B 5/284; G02B 5/288
USPC ......................................................... 356/222
See application file for complete search history.

(56) References Cited

U.S. PATENT DOCUMENTS

| | | | |
|---|---|---|---|
| 2005/0180010 A1 | 8/2005 | Mukaiyama et al. | |
| 2006/0290933 A1* | 12/2006 | Holm | G01N 21/255 356/416 |
| 2008/0013178 A1 | 1/2008 | Terada | |
| 2011/0122308 A1 | 5/2011 | Duparre | |
| 2011/0181948 A1 | 7/2011 | Kindler et al. | |
| 2011/0290982 A1 | 12/2011 | Boutami et al. | |
| 2012/0012963 A1* | 1/2012 | Zhang | G02B 5/284 257/434 |
| 2012/0298867 A1* | 11/2012 | Nishikawa | G01J 5/0018 250/338.3 |
| 2016/0273958 A1 | 9/2016 | Hoenk et al. | |
| 2017/0138790 A1 | 5/2017 | Antila et al. | |
| 2023/0080013 A1* | 3/2023 | Mazzillo | G01J 1/4228 356/222 |

FOREIGN PATENT DOCUMENTS

| | | |
|---|---|---|
| JP | 2007064912 A | 3/2007 |
| JP | 2011523538 A | 8/2011 |
| JP | 2011220769 A | 11/2011 |
| JP | 2011220770 A | 11/2011 |
| JP | 2011253078 A | 12/2011 |
| JP | 2013178338 A | 9/2013 |
| JP | 2014167645 A | 9/2014 |
| JP | 5973747 B2 | 8/2016 |
| JP | 2017049596 A | 3/2017 |

OTHER PUBLICATIONS

3M "Product Bulletin 5000/IJ5000" (Year: 2014).*
MicroChem "SU-8 Photoresist Product Line" (Year: 2009).*
Baumeister, "Optical Coating Technology", SPIE Press monograph, 2004, 6 pages.
Dobrowolski, "The Impact of Computers on the Design and Manufacture of Optical Multilayer Coatings During the Past 50 Years", Bulletin of the Society of Vacuum Coaters, Oct. 2007, 10 pages.
Frey et al., "Multispectral interference filter arrays with compensation of angular dependence or extended spectral fange", Optics Express, vol. 23, Issue 9, 2015, 14 pages.
Lerner, "Limitations in the Use of Dielectric Interference Filters in Wide Angle Optical Receivers", Applied Optics, vol. 10, No. 8, Aug. 1971, 5 pages.
Rana et al., "A combined microfluidic-microstencil method for patterning biomolecules and cells", Biomicrofluidics 8, 2014, 10 pages.
Thelen, "Design of Optical Interference Coatings", Optical and Electro-Optical Engineering Series, 1989, 232 pages.
Tikhonravov, "Design of Optical Coatings", Springer Series in Optical Sciences, vol. 88, 2003, 12 pages.
Lin, L. Chinese Examination Report issued in Chinese Application No. 2019800491165 dated Sep. 1, 2023, with English language translation, 12 pages.

* cited by examiner

FILTER ASSEMBLY, DETECTOR, AND METHOD OF MANUFACTURE OF A FILTER ASSEMBLY

CROSS-REFERENCE TO RELATED APPLICATIONS

This application is the national stage entry of International Patent Application No. PCT/EP2019/070211, filed on Jul. 26, 2019, which claims the benefit of priority of European Patent Application No. 18186348.1, filed on Jul. 30, 2018, all of which are hereby incorporated by reference in their entirety for all purposes.

FIELD OF INVENTION

The disclosure relates to a filter assembly, a detector, and to a method of manufacture of a filter assembly.

BACKGROUND

Dielectric filters such as interference filters are widely used commercially for many different applications, including spectroscopy, medical technology, consumer and security applications amongst others. Interference filters offer a number of advantages in comparison to other types of optical filter such as, for example color coatings. They offer flexibility in terms of engineering design in that they can be optically modelled to predict their performance and engineered for a specific application. They also offer mechanical and thermal stability. Interference filters consist of multiple thin film layers of dielectric material having different refractive indices. Constructive or destructive interference of the incoming light reflected at the interfaces of the layers is used to select one or more spectral bands or lines for transmission, with minimal absorption over the wavelengths of interest.

Dielectric filters are known to exhibit a strong angular dependence with respect to the angle of the incident light. The transmittance wavelength or edge position is principally shifted towards shorter wavelengths for increasing angle of incidence. For diffuse light conditions this can be problematic since it causes spectral broadening or smearing which reduces spectral resolution. Interference filters are typically designed for a defined angle of incidence of the illumination beam, or the desired spectral position can be adjusted by tilting the filter. However, interference filters can be adapted in their design to work with diffuse light conditions such as those provided by diffusers. Multiple thin layers of dielectric material are adjusted with respect to optical and material properties, in order to reduce spectral shift. This often involves complex simulations and cannot generally be applied to different sensor designs. Achieving sufficient field of view paired with low spectral shift remains a challenge.

Known methods to reduce spectral smearing include the use of optics to focus the light direction, or the use of a light stop to limit the angle of the incoming light. For example, attempts to reduce spectral shift under diffuse light conditions include collimating optics which have been integrated into the filter design in order to collect diffuse light and channel it into the filter at a defined angle of incidence of the illumination beam, e.g. at normal incidence. An alternative approach is to control the field of view in the device design using a field stop, so that only light up to a defined angle of incidence can enter, thereby reducing spectral broadening. Previous work has also considered combining interference filters with polymer layers, since the polymer coating can absorb some of the unwanted wavelengths and improve the transmitted signal.

An entirely different approach includes a patterning step, and uses the spatial modulation of the refractive index in a Fabry-Perot cavity with constant thickness. Sub-wavelength patterns are formed in a first transparent material and subsequently are gap-filled by a second transparent material with a different refractive index. The effective refractive index and peak wavelength are directly related to the volume ratio, and by changing the lateral dimensions of the nanostructures the effective refractive index of the Fabry-Perot cavity is increased and the wavelength shift can be compensated.

The impact of spectral shift under diffuse light can be simulated using dedicated optical design and simulation software. FIG. 6A shows a prior art filter assembly. The filter assembly comprises a dielectric filter 50 which is arranged on an exit medium 70, e.g. an optical sensor. The surrounding ambient air can be considered an incident medium with a refractive index N=1. The simulation assumes angles of incidence, AOI, from within ±90° with respect to a surface normal of the dielectric filter.

FIG. 6B shows spectral transmission curves of the filter assembly of FIG. 6A. The curves show simulated transmission graphs (filter transmission T [%]) as a function of wavelength λ and two AOIs (solid line: AOI=0° and dashed line: AOI=90°). The graphs show, when the AOI is changed from 0° to 90°, a percentage of transmission T [%] is reduced and the spectral peak shifts to lower wavelengths. An infrared leakage is shown by transmission in the red/infrared part of the graphs. The leakage also increases for a higher angle of incidence. The transmission under diffuse light conditions will be the result of the combined graphs over all the angles, leading to a broadening of the peak, known as spectral smearing or spectral broadening.

FIG. 7A shows another prior art filter assembly. The filter assembly is based on the one shown in FIG. 6A above but further comprises a diffuser as incident medium 10. The incident medium 10 has a higher index of refraction at N=1.5, which could correspond to a polymer, a scintillator, or any other optical media. FIG. 7B shows a simulated spectral transmission curve similar to FIG. 6B. The resultant transmission curve is the result of a simulation over all angles of incidence from 0° to 90°. The graph indicates that as the index of refraction of the incident media increases, the transmission characteristics may become worse.

FIG. 8A shows another prior art filter assembly. The assembly is similar to the one shown in FIG. 6A. In this case more than one filter 50 is incorporated. The incident medium 10 is in direct contact with the filters, e.g. a short pass filter 51 and a long pass filter 52. The exit media could be a silicon photodiode detector, or another type of detector. This is an example of a dual filter, but the same example could be extended to include more filters.

FIG. 8B shows an ideal spectral transmission curves for the embodiment of FIG. 8A. As an example, the short pass filter 51 could be optimized to transmit wavelengths up to 450 nm, and reflect longer wavelengths, and the long pass filter could be optimized to transmit wavelengths from 670 nm upwards, and reflect shorter wavelengths. Ideally between 450 nm and 670 nm there should be no transmission, e.g. incident green light is reflected as much as possible at 540 nm.

FIG. 8C shows a simulated spectral transmission curve for the embodiment of FIG. 8A. The resultant transmission curve is the result of a simulation over all angles of incidence from 0° to 90°. The optical simulations indicate that in this case the transmission graph would look different than FIG. 8B. The non-optimal performance of the dielectric filters under diffuse light conditions leads to considerable spectral smearing, allowing transmission of green light at 540 nm.

SUMMARY

It is to be understood that any feature described hereinafter in relation to any one embodiment may be used alone, or in combination with other features described hereinafter, and may also be used in combination with one or more features of any other of the embodiments, or any combination of any other of the embodiments, unless explicitly described as an alternative. Furthermore, equivalents and modifications not described below may also be employed without departing from the scope of the filter assembly and the method of manufacture of a filter assembly as defined in the accompanying claims.

A filter assembly comprises an incident medium, a dielectric filter and an exit medium. One aspect relates to engineering a spacer between the incident medium and the dielectric filter, e.g. an air-gap between the incident medium and the filter or filters. It has been found that designing the spacer, e.g. air-gap, allows for reducing the effective refractive index of the filter assembly. It can be shown, e.g. by means of simulations, that spectral smearing can be reduced and transmitted light resolution can be enhanced.

In at least one embodiment a filter assembly comprises an incident medium, a spacer, at least one dielectric filter and an exit medium. The spacer is arranged between the incident medium and the at least one dielectric filter such that the incident medium and the at least one dielectric filter are spaced apart by a working distance. Furthermore, the spacer, the incident to medium and the at least one dielectric filter enclose a medium of lower index of refraction than the incident medium. The at least one dielectric filter is arranged on the exit medium.

The term "filter assembly" indicates a stack comprising the incident medium, the spacer, the at least one dielectric filter and the exit medium. In other words, the components of the filter assembly are stacked with respect to each other along a common optical axis. In the stack or filter assembly further layers may be provided in-between one or more of the incident medium, the spacer, the at least one dielectric filter and the exit medium. However, some or all components of the filter assembly may also be in direct contact to each other.

The "dielectric filter" has a transmission characteristic which is determined by its filter design. The transmission characteristic is a function of angle of incidence. In this sense the transmission of the dielectric filter is direction dependent. Examples of dielectric filters include plasmonic filter and interference filters, e.g. cut-off filters, photopic filters, color filters, band pass filters and any combination thereof.

Incident light from an external radiation source may strike the incident medium from various angles of incidence. Light leaves the incident medium with a distribution of angles depending on the material properties of the incident medium. At a first boundary between the incident medium and the medium of lower index of refraction the incident light is refracted and traverses towards the dielectric filter which is located downstream the medium of lower index of refraction. At a second boundary between the medium of lower index of refraction and the dielectric filter, the incident light is refracted and coupled into the dielectric filter. The incident medium, medium of lower index of refraction and the dielectric filter can be considered a hybrid stack having a mean index of refraction. The mean or effective index of refraction depends on the spacer and, for example, the working distance.

A fraction of the incident light may strike the dielectric filter and is filtered according to the transmission characteristics of the dielectric filter. The so filtered light eventually traverses towards the exit medium, e.g. an optical sensor or electromagnetic radiation sensor, which is located downstream the dielectric filter.

Simulations have shown that the spacer effectively reduces spectral shift and smearing. Typically, spectral shift of the dielectric filter is reduced to a larger degree for larger changes in index of refraction at the boundaries indicated above, for example, at the first boundary. At the same time spectral smearing or broadening is reduced. Furthermore, the filter design of the dielectric filter can be adjusted to comply with the expected range of angles of incidence which further improves spectral selectivity and reduce spectral smearing or broadening.

The proposed filter assembly can be applied to improve the spectral performance of many interference filters, e.g. under diffuse light conditions, and is especially applicable when the refractive index of the incoming media is high. Two example simulations results have shown how much the spectral performance can be improved for two example applications, e.g. computer tomography (CT) detectors and photonic filters. However, applications of the filter assembly are not restricted to these two applications, and the filter assembly is applicable to many interference filter, e.g. under diffuse light conditions. It is also not restricted to the visible wavelengths, but can be applied to interference filters for other wavelength ranges, e.g. infrared.

In at least one embodiment the spacer comprises a single body of material. Alternatively, the spacer may be implemented based on several spacer sections which are distributed at different positions of the dielectric filter and together form the spacer. This way the spacer can be manufactured in one piece or by several pieces, thus, allowing a higher freedom of design.

In at least one embodiment the incident medium is arranged to alter incident radiation such that altered radiation leaves the incident medium with a diffuse radiation distribution.

For example, the incident medium can be arranged as a diffuser or a scintillator.

Thus, the incident medium constitutes a Lambertian surface, i.e. the incident medium has an isotropic exit luminance, and the luminous intensity obeys Lambert's cosine law. Such Lambertian scattering is independent of angle such that there is equal luminance when viewed from all directions lying in the half-space adjacent to the surface. Using a diffuser allows for increased field of view. Implementing the incident medium by way of a scintillator allows for x-ray applications, e.g. by arranging the filter assembly in a computer tomography detector.

The diffuser or optical diffuser comprises a material that diffuses or scatters light, i.e. alters light incident on the incident medium to leave the incident medium with a diffuse radiation distribution. The scintillator converts incident x-ray radiation into light of a specific wavelength. The specific wavelength is largely determined by the material properties of the scintillator. For example, different scintillator layers may have different specific wavelengths. The light generated within the scintillator is diffuse in nature and may exit the incident medium with a diffuse radiation distribution.

In at least one embodiment the incident medium, the spacer and the at least one dielectric filter enclose a cavity. The cavity comprises the medium of lower index of refraction than the incident medium and, thus, contributes to the mean index of refraction introduced above.

In at least one embodiment the cavity is open to the ambient environment. This way the medium of lower index of refraction constitutes the ambient air and has an index of refraction of N=1. Typically, in this situation refraction at the first and second boundary may have the largest effect. Alternatively, the cavity is closed to ambient environment. In this case the medium of lower index of refraction could also be ambient air but also an optically transparent or translucent material with a different index of refraction.

In at least one embodiment the incident medium has a refractive index greater than 1. The greater the difference between refractive index of the incident medium and the medium of lower index of refraction associated with the spacer the greater the effect of refraction at the first and second boundary.

In at least one embodiment the working distance has a value between 0.25 μm and 10 μm and/or the working distance has a value of at least 2 μm. Simulations have indicated that increasing the working distance up to 2 μm reduces spectral shift and spectral smearing. Further increasing the working distance above 2 μm has a negligible effect.

In at least one embodiment the cavity is open and filled with ambient air. The working distance has a value of at least 2 μm. Simulations revealed that a working distance of more than 2 μm shows improved spectral performance.

In at least one embodiment the spacer is arranged at an edge, at edges of the at least one dielectric filter or frames the at least one dielectric filter. Apart from its effect on spectral properties of the filter assembly, the spacer also provides mechanical support, e.g. for the incident medium and dielectric filter.

In at least one embodiment the spacer comprises a patterned adhesive, a patterned optical adhesive and/or a metal layer. This provides additional design options which can be adapted to process technology used to manufacture a given device into which the filter assembly is to be implemented.

In at least one embodiment the exit medium comprises at least one active surface of a detector for electromagnetic radiation. The exit medium could be part of an optical sensor or other detectors such as an x-ray detector. Thus, the filter assembly can be made an integral part of a larger device such as various types of electromagnet detector, e.g. a computer tomography detector or color sensor.

In at least one embodiment the at least one dielectric filter comprises filter elements. The filter elements have different transmission characteristics. For example, the filter elements could be a short pass, bandpass, or low pass filter for bi-color or multicolor applications. The filter elements can be implemented as part of a single dielectric filter or there may be more than the at least one dielectric filter. In this case the dielectric filter and the filter element may be the same. This allows for bi-color or multicolor applications such as photopic and scotopic filter designs to mimic human vision under daylight and night conditions.

In at least one embodiment the filter elements are arranged for bi-color, multicolor, photopic and/or photopic application. These applications may benefit from the improved spectral properties, for example, improved spectral resolution offers more accurate evaluation of sensor readings. For example, there is reduced spectral overlap between neighboring color channels in a color sensor.

In at least one embodiment a computer tomography detector comprises a filter assembly according to the aspects discussed above. Furthermore, the detector comprises an optical sensor further comprising one or more light sensitive areas.

In at least one embodiment the incident medium comprises a scintillator with one or more scintillator layers. The one or more scintillator layers are arranged to convert incident x-ray radiation into light of one or more specific wavelengths. Furthermore, the dielectric filter comprises one or more filter elements having different transmission characteristics corresponding to the one or more specific wavelengths. Finally, the exit medium is comprised by the computer tomography detector.

X-ray radiation may be generated by an external source of a source located within the computer tomography detector. After passing through an object like a human body part, x-rays may strike the scintillator. Then light, e.g. in the infrared, visual, or ultraviolet, is generated within the scintillator layers which is diffuse in nature and exits the scintillator with a diffusive distribution of angles. The generated light can be characterized by the one or more specific wavelengths and is filtered by the dielectric filter according to the transmission characteristics of the filter elements, e.g. a short pass and a long pass filter, respectively.

Simulated spectral transmission curves show improved spectral properties, e.g. spectral overlap between the filter elements due to spectral smearing can be reduced. This allows for improved spectral selectivity in X-ray sensors and applications such as computer tomography detectors.

In at least one embodiment a detector comprises a filter assembly according to the aspects discussed above. Furthermore, the detector comprises an optical sensor having one or more light sensitive areas. The exit medium is comprised by the optical sensor. The incident medium may comprise a diffuser or a scintillator, for example.

In at least one embodiment the detector comprises a filter assembly according to the aspects discussed above. Furthermore, the optical sensor is configured as a color sensor comprising the one or more light sensitive areas. The dielectric filter comprises one or more filter elements, wherein the one or more filter elements have a different transmission characteristic, respectively. For example, the different transmission characteristics may be attributed to different colors such as red, green, blue or other spectral bands or spectral lines of interest. The exit medium is comprised by the color sensor.

The color sensor, e.g. a bi-color or a multicolor sensor depending on the number of filter elements, can be implemented with improved spectral properties for the individual filter elements comprised by the dielectric filter. For example, spectral overlap between the filter elements due to spectral smearing can be reduced. This allows for improved spectral selectivity between sensor signals recorded via the different filter elements. This may contribute to improved accuracy of color detection.

In at least one embodiment a method of manufacture of a filter assembly comprises the steps of providing an incident medium and arranging a spacer between the incident medium and at least one dielectric filter. The spacer is arranged such that the incident medium and the at least one dielectric filter are spaced apart by a working distance and enclose a medium of lower index of refraction than the incident medium. Finally, the at least one dielectric filter is arranged on an exit medium.

In at least one embodiment the spacer is arranged between the incident medium and the at least one dielectric filter by patterning an adhesive and/or optical adhesive. The patterning could be executed on or directly on the incident medium. Alternatively, the patterning could also be executed on or directly on the at least one dielectric filter.

In at least one embodiment the spacer is arranged between the incident medium and the at least one dielectric filter by patterning a metal layer. The patterning could be executed on or directly on the incident medium. Alternatively, the patterning could also be executed on or directly on the at least one dielectric filter.

Further implementations of the method of manufacture of a filter assembly are readily derived from the various implementations and embodiments of the filter assembly, detector and vice versa.

In the following, the principle presented above is described in further detail with respect to drawings, in which example embodiments are presented.

DETAILED DESCRIPTION

Figure 1A:
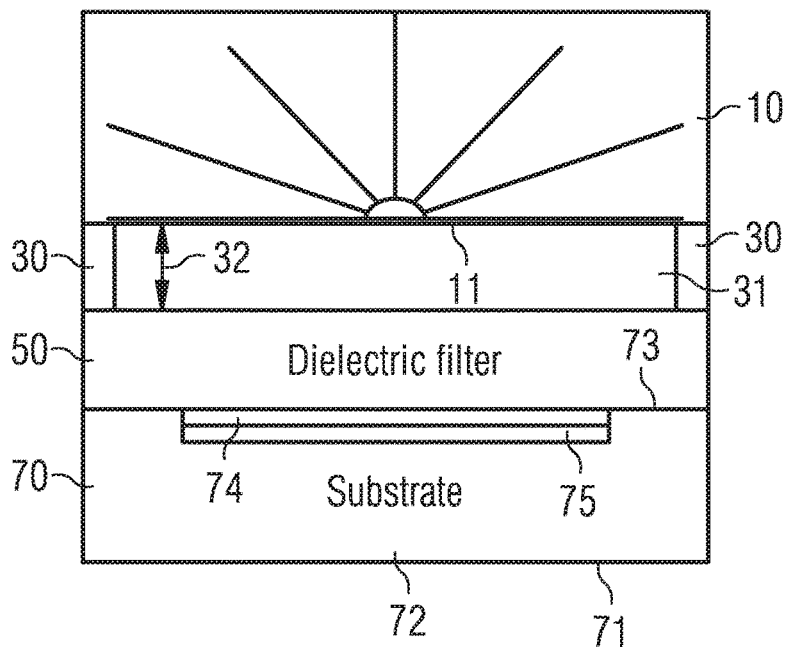
FIGS. 1A, 1B show an example embodiment of the filter assembly and spectral transmission curves.

FIG. 1A shows an example embodiment of the filter assembly. The filter assembly is arranged for an optical sensor. For example, the filter assembly comprises an incident medium 10, a spacer 30, a dielectric filter 50, and an exit medium 70. In this embodiment the exit medium 70 is implemented as part of an optical sensor 71.

The optical sensor 71 comprises a semiconductor substrate 72 having a main surface 73. An integrated circuit 75 is arranged in the semiconductor substrate 72 at or near the main surface 73. The integrated circuit 75 has a light sensitive area 74. During manufacture, the semiconductor substrate 72 may be a silicon wafer, or part of a silicon wafer. For example, the integrated circuit 75 comprises one or more photodiodes, for example, photodiodes sensitive in the visual, UV or (near) infrared range of the electromagnetic spectrum. The photodiodes may be integrated using CMOS process technology.

The dielectric filter 50 is arranged on the main surface 73 of the optical sensor 71. The dielectric filter 50 can be arranged directly on the main surface 73 or there may be a dielectric layer in-between (not shown). Typically, the dielectric filter covers the light sensitive area 74 of the integrated circuit 75. The dielectric filter 50 comprises several layers which, in a wafer-level process, may be sputtered or deposited on top of the last layer of the CMOS process (e.g., a planarized oxide) by which the optical sensor 71, e.g., the light sensitive area 74 or the integrated circuit 75, have been manufactured.

For example, the dielectric filter 50 can be designed as an interference filter or as a plasmonic filter. In both cases, the dielectric filter comprises a stack of different partial layers. An interference filter, for example, comprises alternating layers of dielectric materials with different index of refraction in a target spectrum. The thicknesses of the individual layers are determined by a filter design, for example by means of a dedicated filter design software. The dielectric filter 50 has a transmission characteristic which is determined by its filter design. The transmission characteristic is a function of angle of incidence. In this sense the transmission of the dielectric filter is direction dependent. Examples of interference filters include cut-off filters, photopic filters, color filters, band pass filters and any combination thereof.

The spacer 30 is arranged on the dielectric filter 50. In fact, the spacer 30 is arranged between the incident medium 10 and the dielectric filter 50 such that the incident medium 10 and the dielectric filter 50 are spaced apart and enclose a cavity 31. The cavity 31 comprises a medium of lower index of refraction than the incident medium 10, e.g. ambient air. Thus, by means of the spacer 30 the incident medium 10 and the dielectric filter 50 are spaced apart by a working distance 32. In case of an open cavity 31 and air as medium of lower index of refraction the working distance 32 can be considered an air-gap.

The spacer 30 can be manufactured in different ways, e.g., implemented into the filter design in a manufacturing environment such as at wafer-level. The particular way depends on the material used for the spacer.

One way is to use an optical adhesive as spacer material and implement the spacer by patterning the spacer material onto the dielectric filter 50. This process can be implemented using screen printing or micro stencils, for example. The optical adhesive could either be heated or UV cured after patterning. The process can be adapted to establish a defined and uniform thickness after curing. An alternative approach is to use metal as spacer material. Sputtering can be used to deposit a thin metal layer as the spacer, and then use electroplating to increase the thickness to the required thickness. This may require a patterning step to define a metal seed layer. These are just but two examples of how the spacer 30 could be manufactured. The proposed invention should not be considered limited to these two options.

The spacer 30 can have different geometry. For example, the spacer 30 can be arranged at one or more edges of the dielectric filter 50. Furthermore, the spacer 30 may frame the dielectric filter 50. In this sense the spacer 30 may be comprised of one of more sections, e.g. at edges of the filter or by framing the filter. This way the spacer may only block a small amount of incident light. However, the spacer 30 could also be manufactured using optically transparent material, such as the optical adhesive mentioned above, to further reduce absorption or blocking of incident light. The spacer 30 is not a layer in the sense that would cover the incident medium or dielectric filter along its profile. Rather the spacer 30 is structured or patterned to allow light to pass through the medium of lower index of refraction.

The incident medium 10 comprises an optically transparent or translucent material. Furthermore, the incident medium 10 has an index of refraction N which is greater than 1, e.g. N=1.5. For example, the incident medium 10 can be implemented as a diffuser. If implemented as diffuser the incident medium 10 can be spun on or be arranged by means of molding on top of the spacer 30, for example. The incident medium 10 may be implemented using a transparent organic layer and light scattering particles can be added the medium. The light scattering particles typically have a size between 1 to 15 micrometers, for example. Generally, the size is chosen so that scattering within the diffuser follows the laws of geometric optics so that, essentially, scattering does not depend on wavelength. Furthermore, both the material of the diffuser and of the light scattering particles are chosen not to absorb in the target wavelength region. The diffuser thickness typically ranges within 20 to several 100 micrometers.

Incident light may strike the incident medium 10, e.g. the diffuser, from various angles of incidence (as indicated by the rays in the drawing), i.e. from within ±90° with respect to a surface normal which can be defined by any appropriate surface of the filter assembly. Light leaves the incident medium 10 with an angle having a diffusive distribution of angles. In other words, the incident medium, as diffuser, constitutes a Lambertian surface, i.e. the incident medium has an isotropic exit luminance, and the luminous intensity obeys Lambert's cosine law. Such Lambertian scattering is independent of angle such that there is equal luminance when viewed from all directions lying in the half-space adjacent to the surface.

Incident light eventually traverses through the incident medium 10 and leaves the incident medium at an exit surface 11 with a diffusive distribution of angles as discussed above. The incident light is refracted at a first boundary between the incident medium 10 with a given refractive index and the medium of lower index of refraction in the cavity 31. This medium of lower index of refraction, e.g. ambient air, is enclosed by the incident medium 10 and the dielectric filter 50. From the first boundary between the incident medium 10, i.e. the exit surface 11, the incident light traverses towards the dielectric filter 50 which is located downstream the medium of lower index of refraction in the cavity 31. A second boundary is located between the medium of lower index of refraction in cavity 31 and the dielectric filter 50. The incident light is refracted again and coupled into the dielectric filter 50. The incident medium 10, medium of lower index of refraction and the dielectric filter 50 can be considered a hybrid stack having a mean index of refraction. The mean index of refraction depends on the spacer 30 and, for example, the working distance 32.

Refraction at the first boundary is largely determined by the difference of index of refraction between the incident medium 10 and the medium of lower index of refraction in the enclosure, or cavity 31, e.g. ambient air. If placed within the working distance 32 a spectral shift of the transmission characteristics of the dielectric filter 50 (e.g. its center wavelength) can be kept within given limits under changing angles of incidence. For example, the spectral shift can be kept constant (or within ±1 nm, ±2 nm, ±5 nm, etc.) under angles of incidence from an interval smaller than ±30°, ±20°, ±10°, etc., for example. Thus, spectral shift can be restricted to a degree determined (among other parameters) by the properties of the spacer 30. The working distance 32 can be determined by means of a dedicated optical design and simulation software.

Finally, the light striking the dielectric filter 50 is filtered according to the transmission characteristics of the dielectric filter 50. The so filtered light can then be detected by means of the optical sensor 71 (acting as exit medium 70), for example, the light sensitive area 74 of the integrated circuit 75.

Figure 1B:
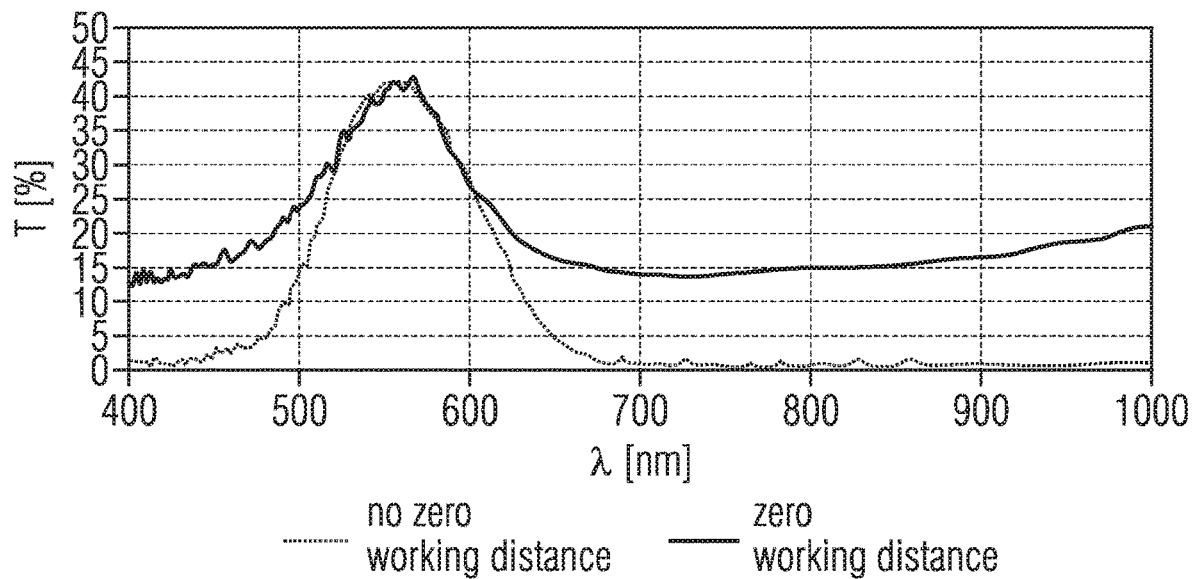

FIG. 1B shows spectral transmission curves of the example embodiment of the filter assembly of FIG. 1A. Simulations indicate that an appropriate value for the working distance 32 of the spacer 30, e.g. an air-gap between the incident medium 10 and the dielectric filter 50, or filters, can reduce spectral broadening and spectral shift as well as enhance the transmitted light resolution.

The curves show simulated transmission graphs (filter transmission T [%]) as a function of wavelength λ [nm] with a non-zero working distance (dashed line) and with a zero working distance (solid line). These results indicate that the presence of the non-zero working distance significantly improves the shape of the transmission graph, showing more of a peak shape with less leakage at the lower and higher wavelengths. The simulation assumed the embodiment of FIG. 1A. For that various angles of incidence within ±90° and an incident medium of N=1.5 have been considered. The cavity 31 is open and, thus, filled with ambient air with an index of refraction of N=1.0.

In conclusion, the embodiment of FIG. 1A shows a considerably reduced impact of spectral shift and spectral smearing. Furthermore, spectral leakage in the infrared is reduced as well. This is mainly due to the spacer 30 arranged in the hybrid structure comprising the incident medium 10, the medium of lower index of refraction in cavity 31 and the dielectric filter 50. For example, the hybrid structure can be represented by a mean index of refraction defined by refraction of incident light at the first and second boundary. In fact, the difference in index of refraction between the incident medium and the medium of lower index of refraction in cavity 31 has been found to improve spectral properties of the dielectric filter 50.

Figure 2A:
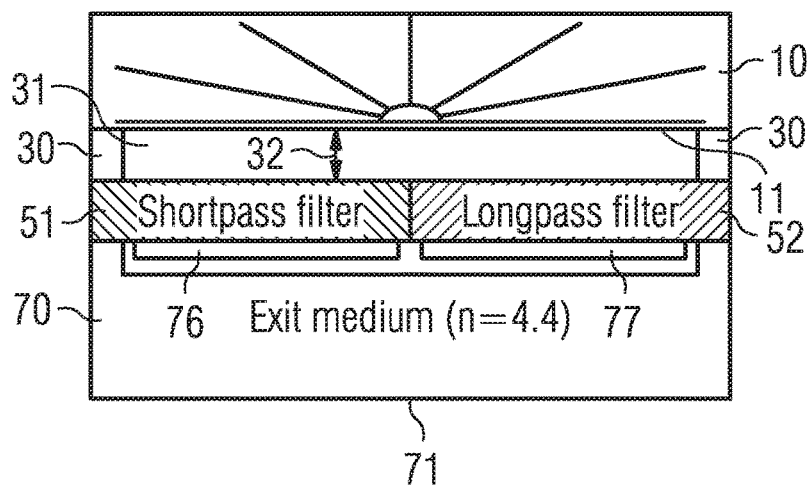
FIGS. 2A, 2B show another example embodiment of the filter assembly and spectral transmission curves.

FIG. 2A shows another example embodiment of the filter assembly. The embodiment is similar to the one shown in FIG. 1A, i.e. the filter assembly is arranged for an optical sensor 71. For example, the filter assembly comprises the incident medium 10 and the spacer 30. In this particular embodiment the incident medium has an index of refraction N=1.8. However, the dielectric filter 50 is a dual filter design and has a first filter 51 and a second filter 52. The first filter 51 and the second filter 52 have different transmission characteristics, e.g. short pass and long pass, respectively.

The first filter 51 and the second filter 52 may be separate or be arranged on a same carrier. The exit medium 70 is implemented as part of an optical sensor 71 but has two different light sensitive areas 76, 77. The exit medium 70 can be arranged in the same semiconductor substrate 72 and same integrated circuit 75. Alternatively, the optical sensor 71 can be arranged over separate semiconductor substrates and/or separate integrated circuits. In any case, each filter 51, 52 is associated with a dedicated one of the light sensitive areas 76, 77.

For example, the optical sensor is a bi-color sensor. The invention can be extended to multi-color sensors, e.g. by using multi-filter design wherein each filter element is associated with a dedicated light sensitive area.

Figure 2B:
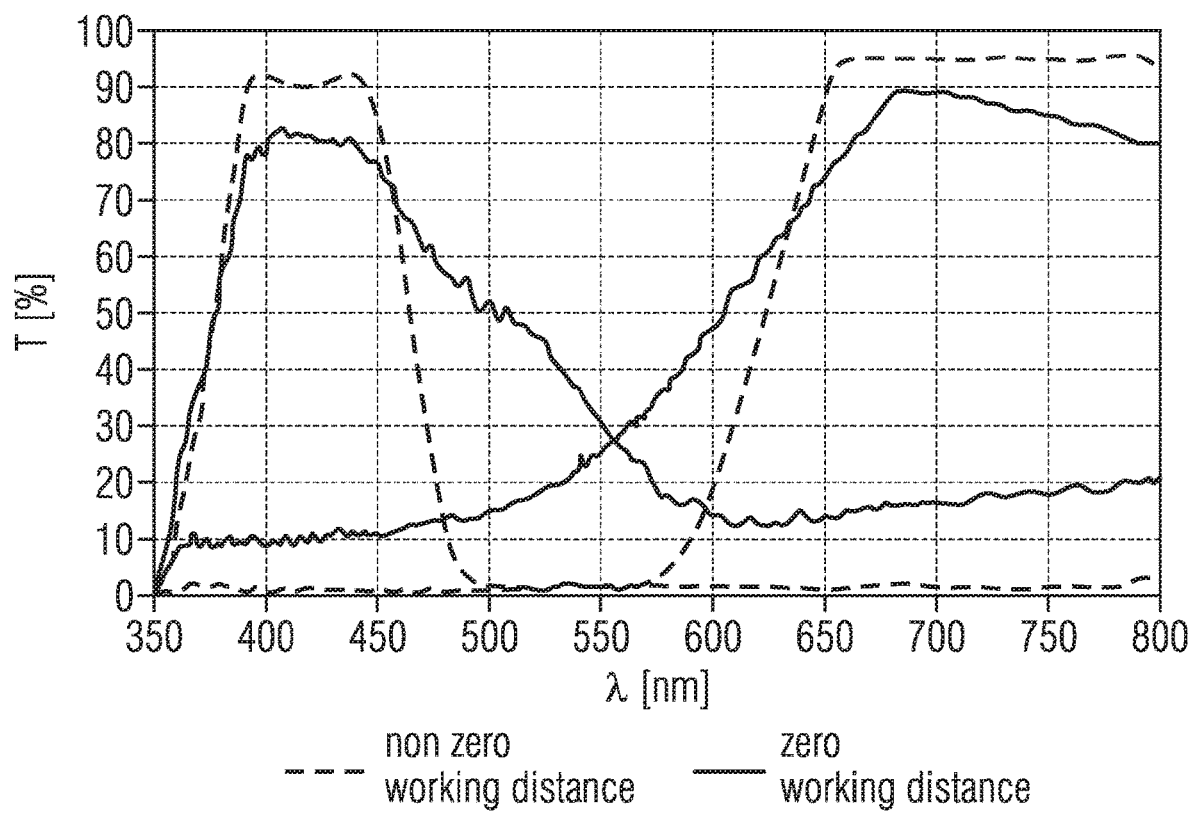

FIG. 2B shows spectral transmission curves of the example embodiment of the filter assembly of FIG. 2A. The curves represent simulated transmission graphs (filter transmission T [%]) as a function of wavelength λ[nm] with a non-zero working distance (dashed line) and without a spacer no working distance arranged between the incident medium and dielectric filter (solid line). Two solid lines are shown representing the short pass and long pass transmission filters, respectively. The simulation assumed the embodiment of FIG. 2A. Various angles of incidence within ±90° and an incident medium of N=1.8 have been considered. The cavity 31 is open and, thus, filled with ambient air with an index of refraction of N=1.0.

The results compare the filter transmission in the case of a no spacer design with an open cavity or air gap design. The simulations show that engineering a spacer 30 into the filter design significantly improves the transmission profile, bringing it closer to an ideal transmission graph.

In conclusion, the findings discussed above with respect to the embodiment of FIG. 1A can be extended to bi-color or multicolor sensors and applications. Thus, spectral properties is improved for the individual filter elements comprised by the dielectric filter 50. For example, spectral overlap between the filter elements due to spectral smearing can be reduced. This allows for improved spectral selectivity in bi-color or multicolor sensors and applications.

Figure 3A:
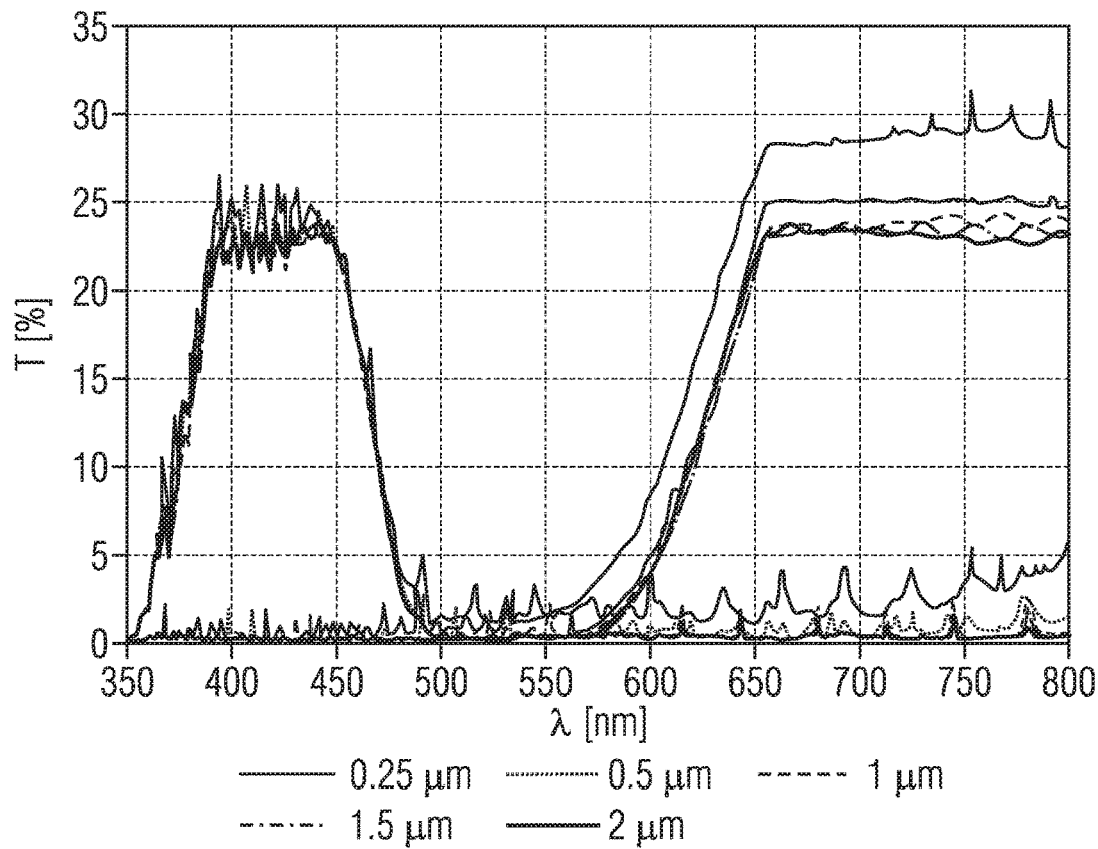
FIGS. 3A, 3B show simulation results of example embodiments of the filter assembly.
Figure 3B:
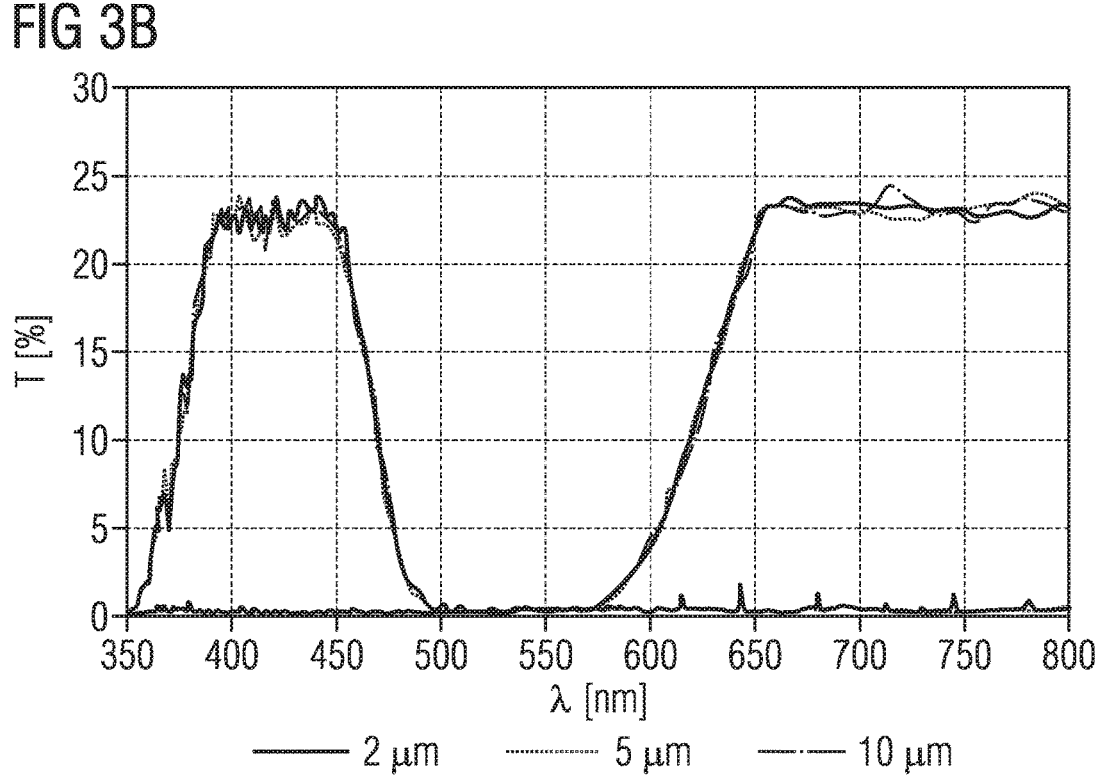

FIGS. 3A and 3B show simulation results of example embodiment of the filter assembly of the example embodiment of the filter assembly of FIG. 2A. The curves represent simulated transmission graphs (filter transmission T [%]) as a function of wavelength $\lambda$[nm]. The simulation assumes the embodiment of FIG. 2A. The transmission graphs have been simulated for varying working distances 32, for example, 0.25 µm, 0.5 µm, 1.0 µm, 1.5 µm, and 2.0 µm (see legend of FIG. 3A), and 2.0 µm, 5.0 µm and 10.0 µm (see legend of FIG. 3B). The results indicate that for a working distance 32 of more than 2 µm the filter transmission is higher and there is improved spectral selectivity between the short pass and long pass filter 51, 52.

The proposed invention is not limited to a diffuser as incident medium, since it can be applied to any application which requires improved spectral resolution, e.g. in the presence of diffuse incoming light. The two example embodiments given below describe how the invention can be used to enhance the performance of (1) a Computer Tomography (CT) detector, and (2) a photopic filter.

Figure 4A:
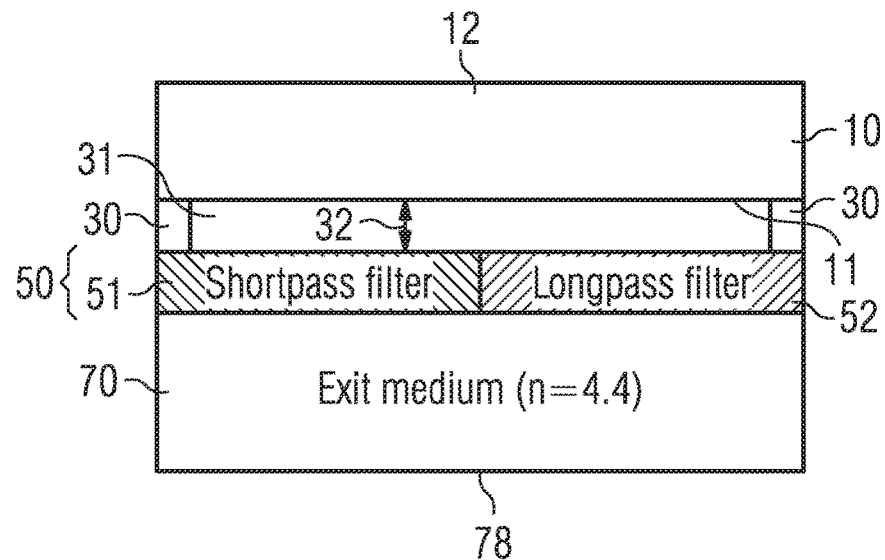
FIGS. 4A, 4B show an example embodiment of the filter assembly for a CT detector with scintillator and spectral transmission curves.

FIG. 4A shows another example embodiment of the filter assembly. The filter assembly is arranged for a computed tomography detector 78 (CT detector). For example, the filter assembly comprises a scintillator 12 as the incident medium 10, the spacer 30, a dielectric filter 50, and an exit medium 70. In this embodiment the exit medium 70 is implemented as part of a CT detector as exit medium. The CT detector may have an index of refraction of about N=4.4. The CT detector 78 includes a plurality of detector elements or light sensitive areas (not shown). The detector elements can be implemented as photodiodes or silicon photomultipliers arranged in the exit medium. Furthermore, the CT detector 78 may include an integrated circuit similar to the optical detector discussed above.

The scintillator 12 is arranged as a scintillator layer. For example, consider that there are two scintillator layers, i.e. a first scintillator layer could be Gadolinium Oxysulphide (GOS), and a second scintillator layer could be Cerium doped Lutetium (LYSO). The scintillator has an index of refraction of about N=1.85, for example.

The spacer 30 is arranged on the dielectric filter 50 as in the previous embodiments. In fact, the spacer 30 is arranged between the scintillator 12 and the dielectric filter 50 which thereby are spaced apart and enclose an open cavity 31. Thus, the cavity 31 is filled with ambient air and can be attributed a refractive index of N=1.0. The dielectric filter 50 comprises a plurality of filter elements, each of which may be attributed to the detector elements, respectively. For example, the dielectric filter 50 comprises two filter elements, e.g. a short pass and a long pass filter.

The CT detector 78 is arranged to detect X-rays generated by an X-ray source and that have passed through an object. The X-rays eventually strike the scintillator 12 and its scintillator layers which convert X-rays into light of a specific wavelength. The specific wavelength is largely determined by the material properties of the scintillator layers. For example, the two scintillator layers have different specific wavelengths. The first scintillator layer made from GOS converts the incoming x-rays into two different wavelengths, i.e. 670 nm (red light) and 520 nm (green light). The second scintillator layer made from LYSO converts the incoming x-rays to 420 nm wavelength (blue light).

The light generated within the scintillator layers is diffuse in nature and exits the scintillator 12 (as incident medium 10) at exit surface 11 with a diffusive distribution of angles as discussed above with respect to FIG. 1A. Finally, light striking the dielectric filters 50 is filtered according to the transmission characteristics of the dielectric filters 51, 52. The two filter elements, e.g. a short pass and a long pass filter, are used to pass the red and blue light to the photodetectors, and block the green light, for example.

Figure 4B:
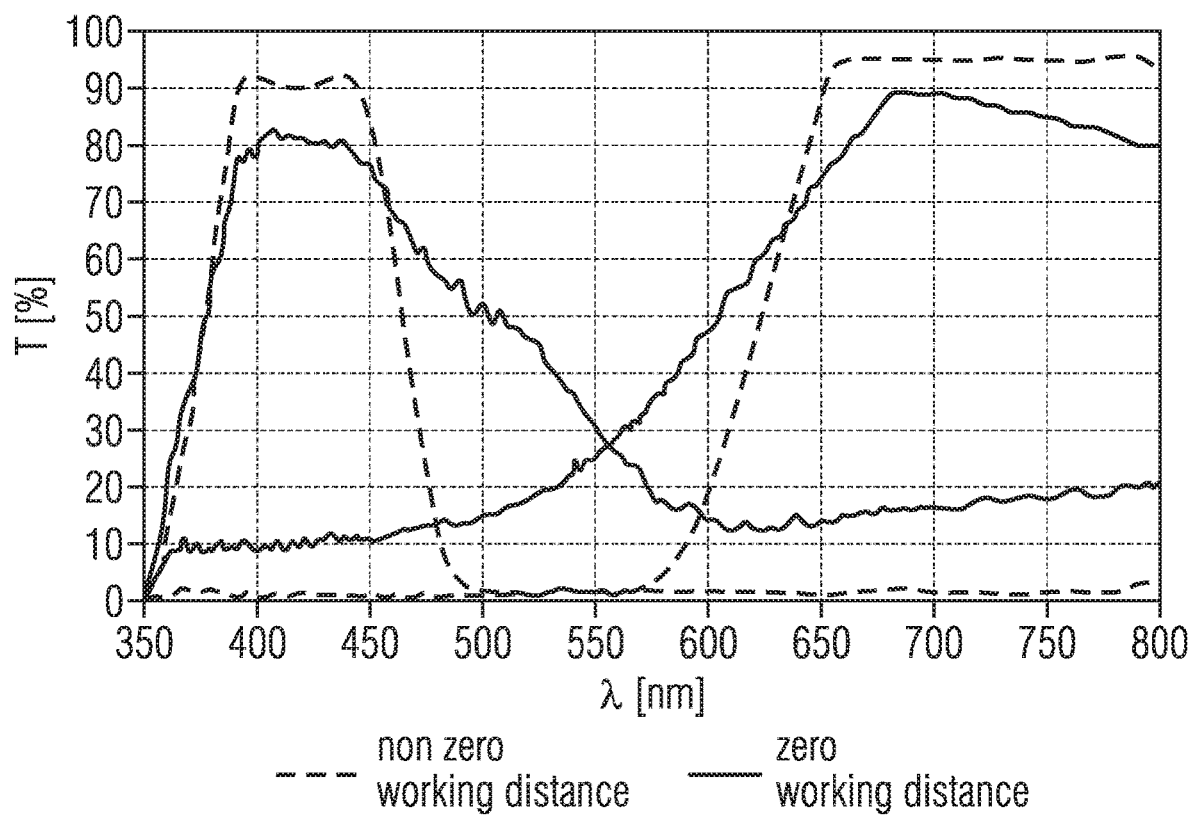

FIG. 4B shows spectral transmission curves of the example embodiment of the filter assembly of FIG. 4A. The curves represent simulated transmission graphs (filter transmission T [%]) as a function of wavelength $\lambda$ [nm] with a non-zero working distance (dashed line) and without a spacer arranged between the incident medium and dielectric filter (solid line). The simulation assumed the embodiment of FIG. 4A.

It is apparent that the filter assembly without spacer 30 creates spectral smearing when light passed through the dielectric filters. The resulting transmission graph is far from ideal (see solid line). Approximately 50% transmission for the green light is shown. By applying the proposed filter design, i.e. by incorporating the spacer 30 and non-zero working distance, the resulting transmission curves can be significantly improved as shown in the drawing (dashed line). The transmission for the green light is reduced to below 10%.

In conclusion, the proposed filter assembly can also be applied to sensor types other than optical sensors. X-ray detectors such as CT detector 78 are based on scintillators which by nature introduce diffusive distribution of angles in light generated in the scintillator layers. Spectral properties is improved for the dielectric filter 50, e.g. spectral overlap between the filter elements due to spectral smearing can be reduced. This allows for improved spectral selectivity in X-ray sensors and applications such as CT detectors.

Figure 5:
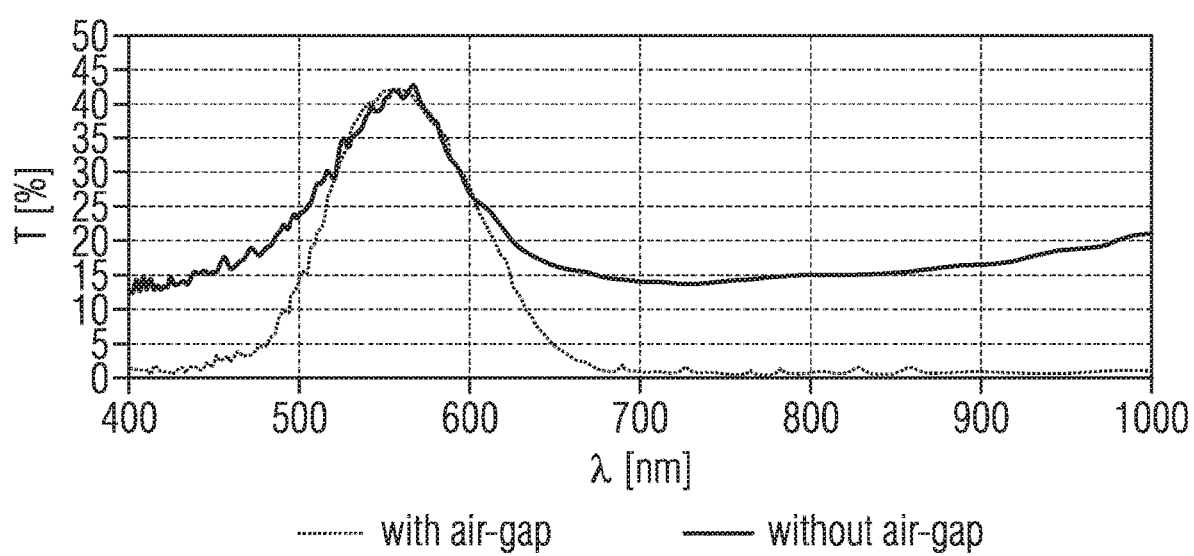
FIG. 5 shows an example spectral transmission curve for a photopic filter.
Figure 6A:
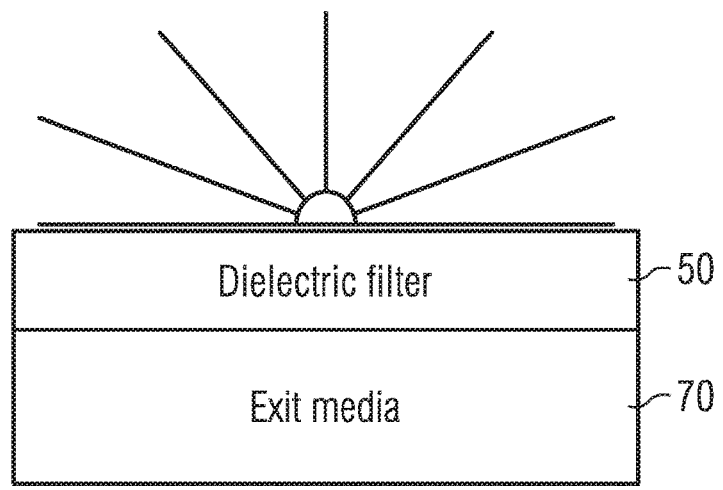
FIGS. 6A, 6B show a prior art filter assembly and spectral transmission curves.
Figure 6B:
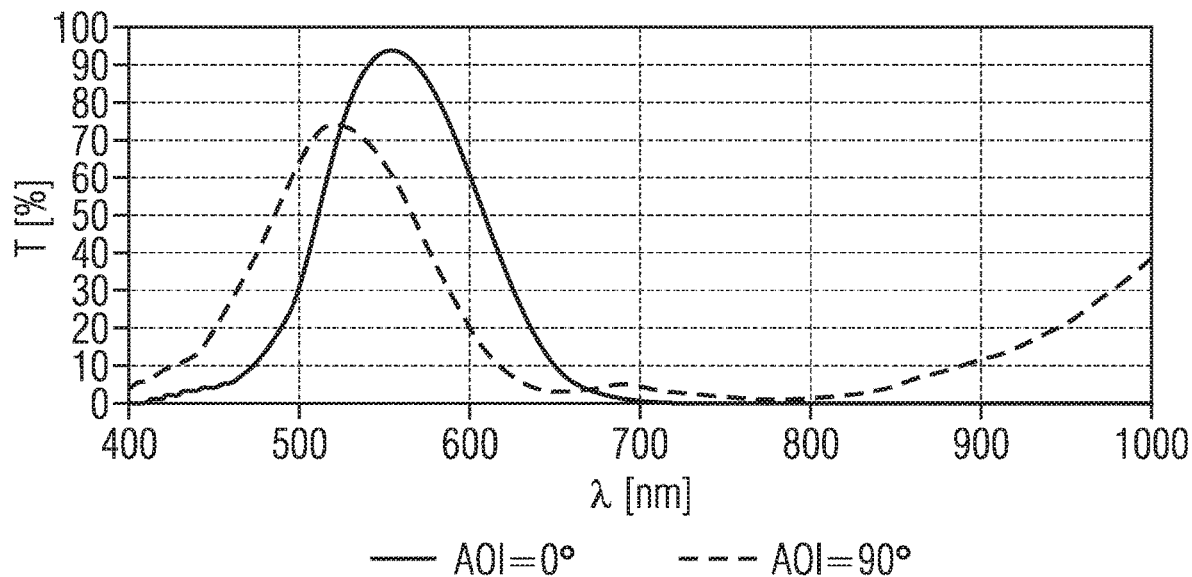
Figure 7A:
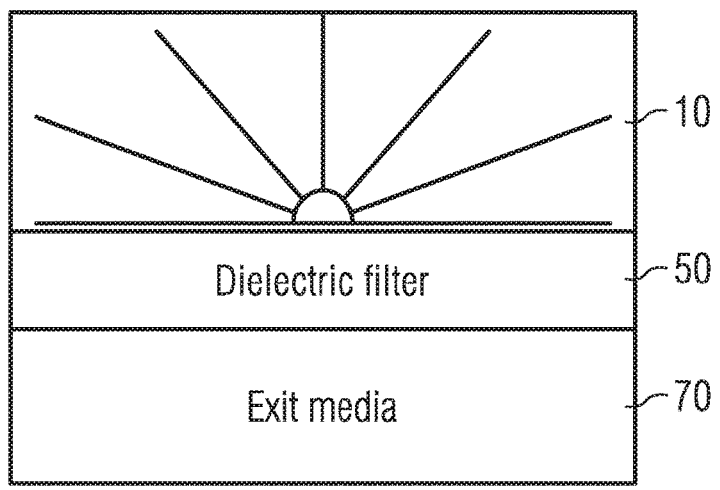
FIGS. 7A, 7B show another prior art filter assembly and spectral transmission curves.
Figure 7B:
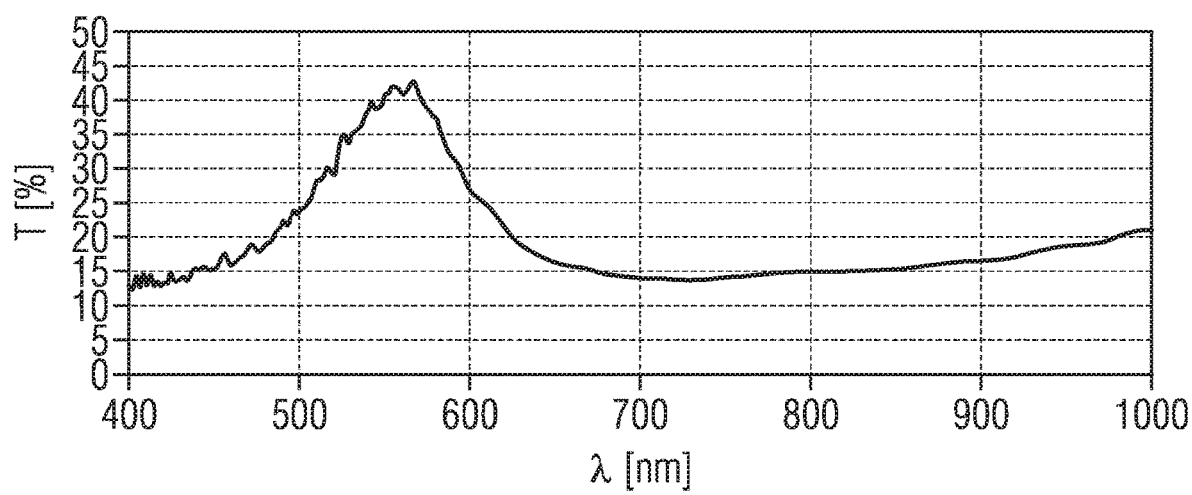
Figure 8A:
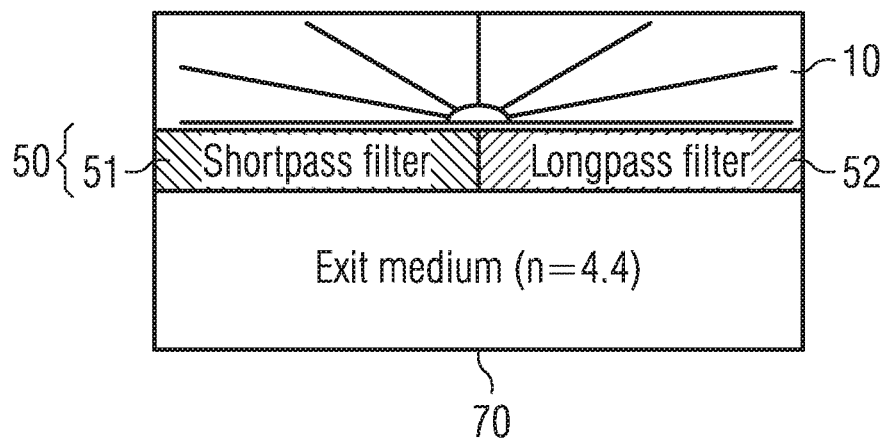
FIGS. 8A, 8B, 8C show another prior art filter assembly and spectral transmission curves.
Figure 8B:
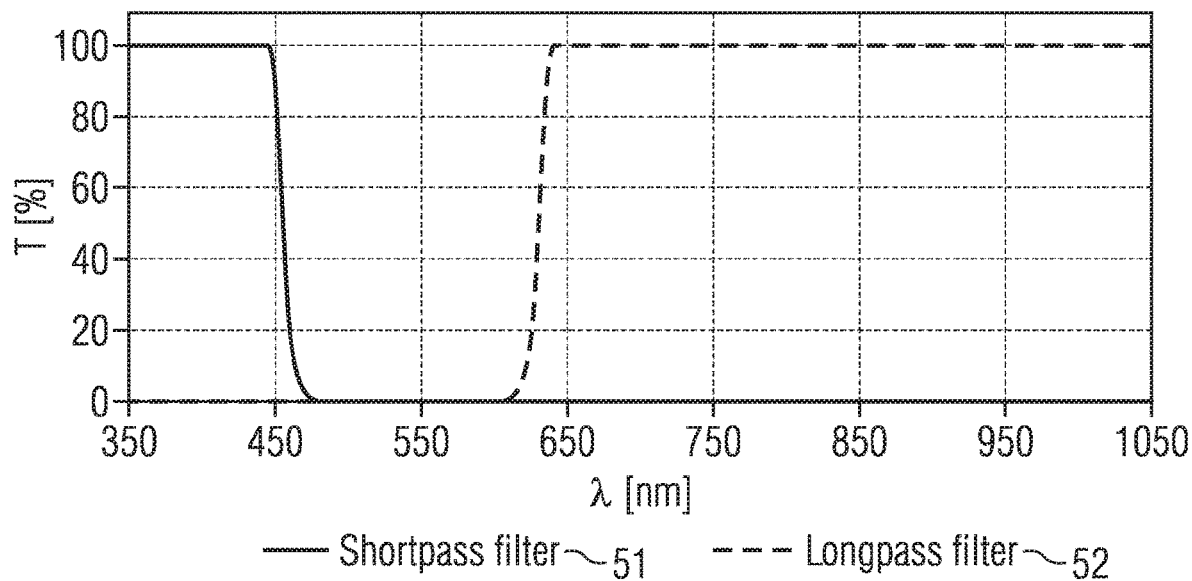
Figure 8C:
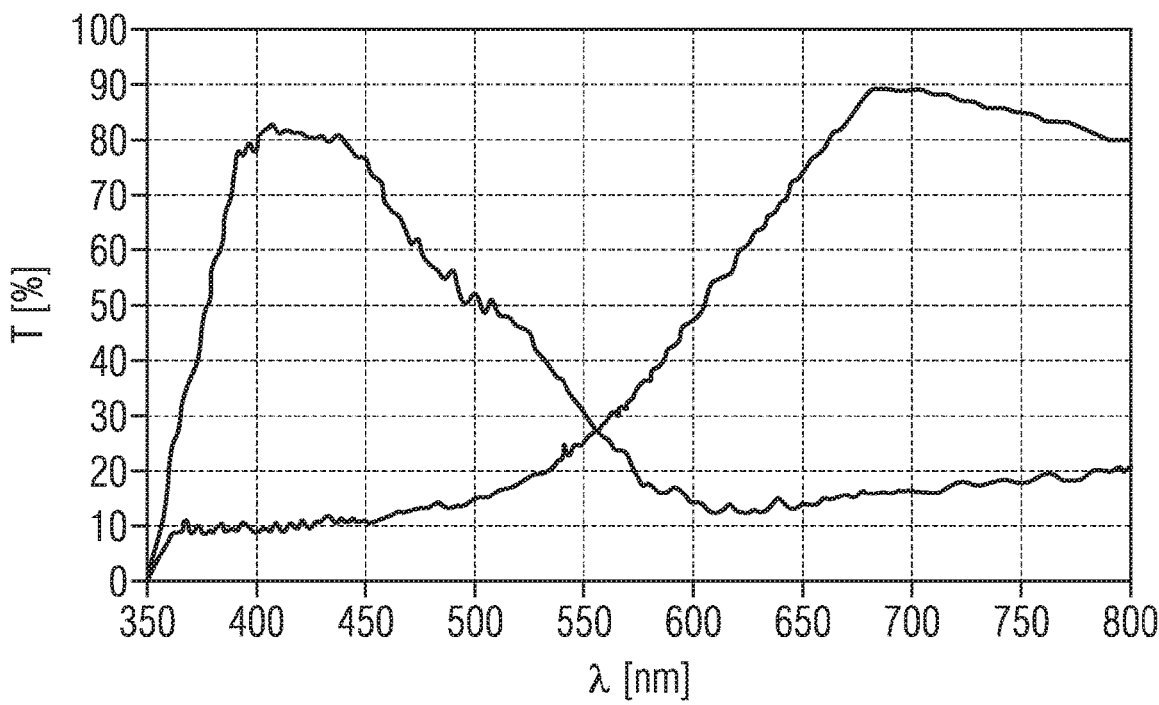

FIG. 5 shows simulated spectral transmission curves for a photopic filter. The simulation assumes a dielectric filter 50 which consists of a multilayer of $Nb_2O_5$ and $SiO_2$ as the high and low index materials, respectively. This dielectric filter 50 can be used as filter in the embodiment of FIG. 1A, for example. For example, one objective may be to produce a photopic interference filter that passes light with 555 nm, full width–half maximum FWHM=100 nm.

The simulation results are depicted as simulated transmission graphs (filter transmission T [%]) as a function of wavelength $\lambda$ with a spacer 30 (dashed line) and without a spacer 30 arranged between the incident medium 10 and dielectric filter 50 (solid line). If the photopic interference filter 50 is illuminated with parallel light at 0° AOI (nominal incidence) the peak position is centered at 555 nm. If the same filter 50 is illuminated with diffuse light having Lambertian distribution of AOI, then the peak position shifts, there is a broadening of the filter shape, and infrared leakage increases (see solid line). The spectral response of the photopic interference filter 50 can be enhanced by applying the spacer 30 and working distance 32 as proposed herein. In the case of a coating with air-gap (i.e. open cavity design)

the stopband and transmittance performance of the filter 50 is appreciably better than in the case of coating without an air-gap (see dashed line).

In conclusion, the hybrid structure including the spacer allows for improving spectral properties in photopic filter design. The same principles may also be applied to scotopic filter design as well. These types of filters are specifically designed to resemble human vision at daylight and at night, respectively. Reducing the impact of spectral shift, smearing and leakage thus improves optical sensor performance in human vision applications, such as color sensors.

In another embodiment (not shown) the filter assembly is configured for the infrared (IR) part of the spectrum, e.g. the near infrared. The dielectric filter 50 has a transmission characteristic with spectral windows in the IR, e.g. between 700 nm-1 mm. For example, the spectral window or windows lie in the near infrared (NIR) between 0.75-1.4 µm. The embodiments shown above can be used together with the filter assembly also in the IR and NIR. Depending on the spectral windows, however, materials used for the indicent medium and exit medium may be adjusted to match in their optical properties. For example, a semiconductor such as silicon as material for the semiconductor substrate 72 shows transmission in the IR and may be exchanged with a material that does not feature significant transmission in the IR.

In general the filter assembly can be applied to improve the spectral performance of many interference filters, e.g. under diffuse light conditions, and is especially applicable when the refractive index of the incoming media is high. The filter assembly is not restricted to diffuse light conditions or visible wavelengths. In fact, the filter assembly can be applied to interference filters for other wavelength ranges, e.g. infrared or ultraviolet, UV.

The invention claimed is:

1. A filter assembly, comprising an incident medium, a spacer, at least one dielectric filter and an exit medium, wherein:
   the spacer is arranged between the incident medium and the at least one dielectric filter such that the incident medium and the at least one dielectric filter are spaced apart by a working distance and thereby enclose a medium of lower index of refraction than the incident medium,
   the at least one dielectric filter is arranged on the exit medium
   the material of the spacer is optically transparent, and
   the incident medium, the medium of lower index of refraction and the dielectric filter form a hybrid stack having a mean index of refraction, which depends on the spacer and the working distance,
   the at least one dielectric filter is placed within the working distance from the incident medium and has transmission characteristics, wherein the working distance has a non-zero value between 0.25 µm and 10 µm,
   the working distance is arranged such that spectral shift and spectral smearing of the transmission characteristics of the dielectric filter is smaller as compared to a zero working distance.

2. The filter assembly according to claim 1, wherein the spacer is arranged to restrict a spectral shift of light incident under changing angles of incidence.

3. The filter assembly according to claim 1, wherein the working distance is arranged such that a spectral shift of the transmission characteristics of the at least one dielectric filter is kept within given limits under changing angles of incidence.

4. The filter assembly according to claim 1, wherein the incident medium is arranged to alter incident radiation such that altered radiation leaves the incident medium with a diffuse radiation distribution.

5. The filter assembly according to claim 1, wherein
   the incident medium, the spacer and the at least one dielectric filter enclose a cavity, and
   the cavity comprises the medium of lower index of refraction than the incident medium.

6. The filter assembly according to claim 5, wherein
   the cavity is open to ambient environment,
   the cavity is open, filled with ambient air, and the working distance has a value of at least 2 µm and of at most 10 µm, or
   the cavity is closed to ambient environment.

7. The filter assembly according to claim 1, wherein the incident medium has a refractive index greater than 1.

8. The filter assembly according to claim 1, wherein
   the working distance has a value of at least 2 µm and of at most 10 µm.

9. The filter assembly according to claim 1, wherein the spacer is arranged at an edge, edges, or frame of the at least one dielectric filter.

10. The filter assembly according to claim 1, wherein the spacer comprises:
    a patterned adhesive, or
    a patterned optical adhesive.

11. The filter assembly according to claim 1, wherein the exit medium comprises at least one active surface of a detector for electromagnetic radiation.

12. The filter assembly according to claim 1, wherein:
    the at least one dielectric filter comprises a plurality of dielectric filter elements, and
    each of the plurality of dielectric filter elements have different transmission characteristics.

13. The filter assembly according to claim 12, wherein the plurality of dielectric filter elements are arranged for bicolor, multicolor, photopic and/or photopic application.

14. The filter assembly according to claim 1, wherein the incident medium is a scintillator.

15. A detector, comprising:
    a filter assembly according to claim 1,
    an optical sensor comprising one or more light sensitive areas, wherein the exit medium is comprised by the optical sensor.

16. The detector according to claim 15, wherein the at least one dielectric filter comprises a plurality of dielectric filter elements, wherein the plurality of dielectric filter elements have different transmission characteristics, respectively.

17. A method of manufacture of a filter assembly comprising:
    providing an incident medium,
    arranging a spacer between the incident medium and at least one dielectric filter such that the incident medium and the at least one dielectric filter are spaced apart by a working distance and enclose a medium of lower index of refraction than the incident medium, wherein the material of the spacer is optically transparent,
    arranging the at least one dielectric filter on an exit medium, and wherein:
    the incident medium, the medium of lower index of refraction and the dielectric filter form a hybrid stack having a mean index of refraction, which depends on the spacer and the working distance,
    the at least one dielectric filter is placed within the working distance from the incident medium and has transmission characteristics, wherein the working distance has a non-zero value between 0.25 μm and 10 μm, the working distance is arranged such that spectral shift and spectral smearing of the transmission characteristics of the dielectric filter is smaller as compared to a zero working distance.

18. The method according to claim 17, wherein the spacer is arranged between the incident medium and at least one dielectric filter by patterning an adhesive and/or an optical adhesive.

* * * * *